United States Patent
Dufosse et al.

(10) Patent No.: US 9,942,681 B2
(45) Date of Patent: Apr. 10, 2018

(54) APPLIANCE FOR RECEIVING AND READING AUDIO SIGNALS AND LIVE SOUND SYSTEM

(71) Applicant: AUGMENTED ACOUSTICS, Paris (FR)

(72) Inventors: Stéphane Dufosse, Paris (FR); Laurent Said, Paris (FR); Frédéric Paty, Paris (FR); Stéphanie Plasse, Paris (FR)

(73) Assignee: AUGMENTED ACOUSTICS, Paris (FR)

( * ) Notice: Subject to any disclaimer, the term of this patent is extended or adjusted under 35 U.S.C. 154(b) by 0 days.

(21) Appl. No.: 15/548,842

(22) PCT Filed: Feb. 5, 2016

(86) PCT No.: PCT/FR2016/050243
§ 371 (c)(1),
(2) Date: Aug. 4, 2017

(87) PCT Pub. No.: WO2016/124865
PCT Pub. Date: Aug. 11, 2016

(65) Prior Publication Data
US 2018/0035232 A1 Feb. 1, 2018

(30) Foreign Application Priority Data
Feb. 5, 2015 (FR) .................................... 15 50923

(51) Int. Cl.
*H04S 3/00* (2006.01)
*H04R 1/10* (2006.01)
*H04W 88/02* (2009.01)

(52) U.S. Cl.
CPC ........... *H04S 3/004* (2013.01); *H04R 1/1083* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 2014/0328485 A1 | 11/2014 | Saulters | |
| 2014/0334644 A1* | 11/2014 | Selig | H03G 5/165 381/108 |
| 2015/0124995 A1* | 5/2015 | Defnet | H04R 27/00 381/82 |

FOREIGN PATENT DOCUMENTS

CN 2904481 Y 5/2007

OTHER PUBLICATIONS

International Search Report as issued in International Patent Application No. PCT/FR2016/050243, dated Apr. 29, 2016.
(Continued)

*Primary Examiner* — Paul Huber
(74) *Attorney, Agent, or Firm* — Pillsbury Winthrop Shaw Pittman LLP

(57) ABSTRACT

An appliance for receiving and reading audio signals, includes a receiver of high-frequency electromagnetic waves designed to capture radio broadcast signals including a plurality of audio tracks; a wireless communication interface, separate from the receiver and designed to receive at least one regulating parameter to be applied to at least one audio track of the captured signal; and a digital signal processor designed to apply the regulating parameter to the audio track and produce a mixed signal.

8 Claims, 2 Drawing Sheets

(56) References Cited

OTHER PUBLICATIONS

"Search Results—Gear Patrol," Nov. 2015, Retrieved from the Internet: URL: h/ttps://gearpatrol.com/search-results/?q=noise%20headphones [retrieved Nov. 4, 2015].

* cited by examiner

APPLIANCE FOR RECEIVING AND READING AUDIO SIGNALS AND LIVE SOUND SYSTEM

CROSS-REFERENCE TO RELATED APPLICATIONS

This application is the U.S. National Stage of PCT/FR2016/050243, filed Feb. 5, 2016, which in turn claims priority to French patent application number 1550923 filed Feb. 5, 2015. The content of these applications are incorporated herein by reference in their entireties.

The present invention generally relates to sound systems for improving the sound experience of a listener attending a show.

The term "show" refers to any event which takes place in front of a public (also referred to as an audience) and which includes one or more sound sources (such as voice, noises, musical instruments). The show may be, for example, a concert, a theater play, a performance (e.g. a one-man show), a ballet, a conference, a meeting, a film, a radio or television program, recorded live and in public.

The spectacle may be fit with a sound system, i.e. the sounds of the show are broadcast (and possibly amplified) to the attention of the public by means of a (digital or analog) sound reproduction device.

The show may be live, performed on a stage, which refers to a place where the sound sources (e.g. musicians) are grouped or distributed; the audience may be grouped or divided into a hall, which in the case of a live performance may be adjacent to (or distant from) the stage. The configuration of the hall is arbitrary; it is not necessarily covered; the hall may be located below (or above) the stage. The hall may be stepped or flat. The hall may occupy the front of the stage (typically in a theater) or surround it (typically in a stadium). For some outdoor shows, the term "hall" may in fact refer to an undefined space, such as a lawn or an arena.

The quality of the sound perceived by a listener may be affected by several objective criteria (independent from the listener's will): the acoustics of the place (presence of parasitic reflections, echoes, resonance modes), the quality of the sound system, the constraints that the mixing sound engineers face, and the presence of parasitic noises (e.g. generated by a noisy audience).

Other subjective criteria (related to the listener himself) may also affect the sound quality, including the listener's position in the hall and its sensitivity to certain frequencies within the audio spectrum, more than to other frequencies.

Some measures may be taken in order to improve the quality of the sound perceived by the listeners. It is e.g. possible to modify the architecture of the place in order to improve its acoustics. It is also possible to replace all or part of the sound system equipment. It is however difficult to make a theater versatile. In particular, some frequencies may be absorbed by the walls, or on the contrary totally reflected. A hall may resonate at certain frequencies and generate parasitic vibrations at other frequencies. In addition, acoustics suitable for chamber music may, for example, not be adapted to pop music, and vice versa.

There hence is a need to better adapt the sound to listeners' expectations. It should be noted that, since listenery perception is subjective, a sound system may be considered satisfactory by some listeners and, on the contrary, unsatisfactory by others.

US Patent Application No. US2014/0328485 discloses an audio system configured to provide enhanced sound effects to a listener equipped with a mobile terminal and an audio headset. To this end, this system comprises a console coupled, on the one hand, to a plurality of microphones and, on the other hand, to a wireless access point. The console is programmed to transfer to the mobile terminal, via the wireless access point, audio signals received on different channels from several microphones. A central server is responsible, at the request of each user, for performing the custom mix required by this user.

This solution may seem to solve the aforementioned difficulties, but it is not free from defects. First, the centralized client/server architecture described (a customized mix of the different audio channels is provided in point-to-point mode on each user's request) causes the central server to overload, whereas the latter is supposed to dialogue with each user terminal (which forms the control interface) and provide it with a mixed signal on demand. Although an alternative solution is briefly mentioned, which consists in processing the console signal directly at the terminal, this solution threatens to rapidly exhaust the battery of the terminal.

In addition, US2014/0328485 proposes to avoid the superimposition, in the listener's ears, of the console audio and direct signals received from the sound system by introducing a delay in the reproduction of the signal received from the console, in order to synchronize it with the direct signal. In practice, a given loudspeaker emits a pulsation (out of the audible spectrum) into the hall to allow, via a microphone fitted to the terminal, to calculate the distance from the loudspeaker and deduce a delay to apply to the console signal. This procedure is, in practice, difficult to follow because the loudspeaker which emits the pulsation is not necessarily the closest to the listener, so that the delay included in the reproduction of the console signal may not allow synchronization to the direct signal. In addition, most mobile terminals (including smartphones) are equipped with low-pass filters that will eliminate the frequencies at which pulsations are emitted. As a result, for most users, the system disclosed in this document will simply not work.

A first object is to improve, from the listener's point of view, the quality of the sound reproduction of a performance, whilst avoiding, as far as possible, the factors likely to affect the quality of the reproduction.

A second object is to allow an individualized personalization of the sound returned from the show.

To this end, there is provided, first, an appliance for receiving and reading audio signals intended to equip a listener and to be controlled by a mobile terminal incorporating a graphic interface, that mobile terminal being distinct from the appliance, the latter comprising:

- a high frequency electromagnetic wave receiver configured to capture broadcast signals that include a plurality of audio tracks;
- a wireless communication interface distinct from the wave receiver and configured to receive, from the mobile terminal, at least one tuning parameter to be applied to at least one audio track of the captured signal;
- a digital signal processor configured to apply the tuning parameter to the audio track and output a mixed signal;
- an audio output for the sound reproduction of the signal mixed by the processor.

According to various additional characteristics, taken individually or in combination:

- the appliance further comprises an embedded microphone, configured to capture a sound signal in the vicinity of the appliance;

the processor is configured to compute a time offset between the signal mixed by the processor and the sound signal captured by the microphone;

the processor is configured to apply to the mixed signal a delay equal to the computed time offset.

There is provided, secondly, an audio headset incorporating an appliance as disclosed above. The headset may further include an acoustic noise reduction system.

Thirdly, there is provided a sound system for a show, this system comprising:

a mixer that receives audio tracks;

a transmitter connected to the mixer and configured to communally broadcast the audio tracks in a multichannel mode;

at least one appliance for receiving and reading the broadcast signal, as presented above;

a mobile terminal configured to transmit to the receiving appliance, via its second communication interface, at least one tuning parameter to be applied to at least one audio track;

a headphone connected to the audio output of the appliance, for the playback of the mixed signal.

According to various additional features, taken individually or in combination:

the show is live and includes sound sources, and the system includes microphones pointing to the sound sources to capture the sounds in the form of an electrical signal forming an audio track for each microphone;

the system comprises a mobile terminal configured to transmit to the receiving appliance, via its second communication interface, at least one tuning parameter to be applied to at least one audio track.

Other features and benefits of the invention will appear more clearly and practically upon reading the following description of preferred embodiments, given with reference to the accompanying drawings, in which:

FIG. 1 shows a sound system 1 for a show emitting sounds (voices and/or noises and/or music) for the benefit of a public (or audience) composed of one or more listeners 2. This show may take place live.

Figure 1:
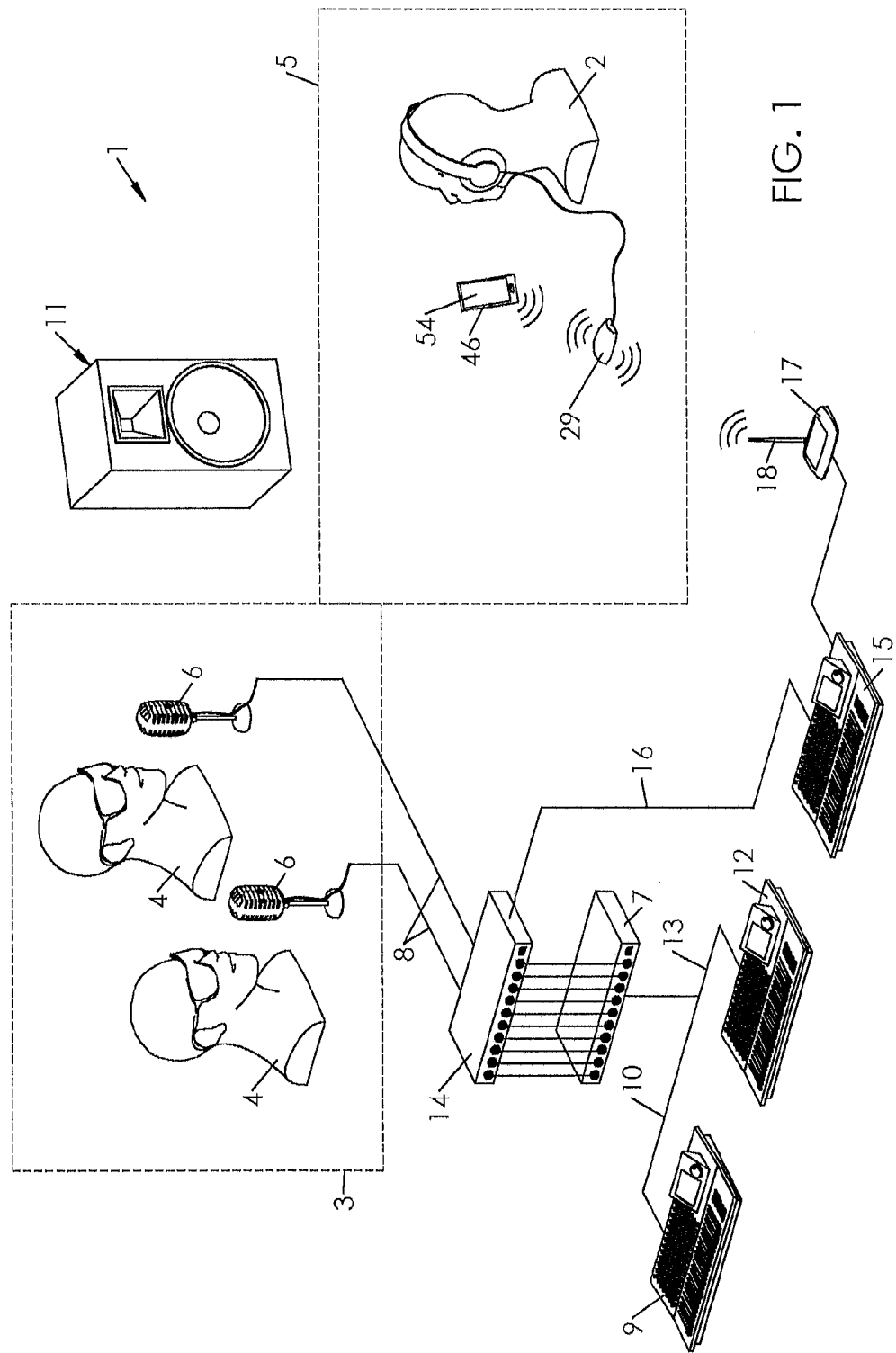
FIG. 1 is a schematic perspective view illustrating a sound system of a show, said sound system being equipped with a reception and reading appliance.

The show may be a concert, a theater play, a performance (e.g. a one man show), a ballet, a conference, a meeting, a film, radio or a live television broadcast, live and in public.

When it implies performing arts, the show takes place in a location 3 and includes, within this location 3, sound sources 4 (the show may, in addition to the sound sources 4, include non-sound visual sources). In what follows, this location 3, which is not necessarily clearly defined, is designated by the term "stage". In some cases, e.g. when the show is a concert, the stage 3 designates a place where the artists who perform the show are gathered. In the depicted example, the show is performed by musicians (two singers are represented) who form sound sources. The stage 3 is schematized by a dotted rectangle that frames the musicians 4. When the show is recorded (e.g. a film) or broadcasted away from the place where it takes place, e.g. a sports meeting held in a stadium and broadcast outside the stadium for the benefit of a supernumerary audience), the term "stage" may designate a screen on which the visual part of the show is projected, The listeners 2 may be gathered, or on the contrary disseminated, in front of or around the scene 3, or in front of screens which remotely display the show. The term "hall" usually refers to a place that is both covered and delimited. Here, the notion of hall is generalized, referenced and under number 5, to designate any place where the listeners 2 are. In the simplest case (e.g. in the illustrated case of a concert played on a stage 2), the hall 5 is indeed covered and delimited, and extends in front of the sage 3. But the room hall 5 may have any configuration; it may be an undefined space, not necessarily covered, such as a lawn or an arena, e.g. in the case of concerts played outdoors and/or in a stadium.

The show is sounded, i.e. that the sounds coming from the sound sources 4 (the musicians in the depicted example) are captured by the sound system 1, which includes to this end microphones 6 pointing to the sound sources 4 in order to capture the sounds thereof, under the form, for each microphone 6, of an electrical signal forming an audio track. Preferably, a microphone 6 is allocated to each sound source 4. In FIG. 1, the microphones 6 are shown fixed, but at least some of them may be mobile. In particular, a microphone 6 may be portable, in particular if its source 4 is mobile, e.g. the singer or the guitarist of a music band. In that case, the microphone 6 may be hand-held by the protagonist, or hooked to him or his instrument (or even embedded to it, e.g. in the case of an electric guitar).

In a conventional manner, the system 1 may comprise a primary audio splitter 7 which retrieves the audio track from each microphone 6 via a wired input audio line 8, as in the example shown, or radiofrequencies (RF) in the case of a wireless microphone.

The splitter 7 comprises several inputs to be able to gather in parallel the signals generated by the various microphones 6. The capture of sounds is therefore multitrack (i.e. on different tracks), real-time.

The sound system 1 may comprise a first mixing table 9 connected to the primary splitter 7 by a link 10 (wired or RF) by which the first mixing table 9 receives different channels coming from the audio lines 8.

This first mixing table 9 is connected, at the output, to a sound reproducing device 11, hereinafter referred to more simply as "PA", which comprises loudspeakers facing the listeners 2. The PA 11 may be configured in any manner, preferably in accordance with the habits of sound engineers; it may hence comprise loudspeakers mounted in a line array, arranged in a matrix, or grouped in front of stage 3. For simplicity, the PA 11 is shown in FIG. 1 by a single loudspeaker.

The various channels originating from the primary splitter 7 are mixed by means of the first mixing table 9 to form a first sound composition intended to be broadcasted in the open field to the public via the PA 11.

To this end, a sound engineer is responsible for mixing at the first table 9, in order to apply, for the room 5, settings applied to the various tracks, among which sound volume, balance, equalization.

As can be seen in FIG. 1, the sound system 1 may comprise a second mixing table 12 connected to the primary splitter 7 via a link 13 (wire or RF) by which the second table 12 also receives the channels coming from the audio lines 8.

The different channels from the primary splitter 7 are mixed by the second table 12 to form a second sound composition intended for the stage 3 (via return loudspeakers, not shown).

For this purpose, a sound engineer (the same as previously or another one) is responsible for mixing at the second table 12, in order to apply, for the scene 3, settings applied to the different tracks, among which the volume sound, balance, equalization.

According to one embodiment illustrated in FIG. 1, the sound system 1 further comprises a secondary splitter 14 mounted in parallel (or cascade) with the primary splitter 7 and which likewise recovers the signal from each microphone 6 via the same input audio lines 8. At the output of the secondary splitter 14, the audio tracks may be identical to those originating from the primary splitter 7, or different, depending on the settings (identical or different) applied to the splitters 7, 14, The sound system 1 also comprises a third mixing table 15 connected to the secondary splitter 14 by a link 16 (wired or RF) through which the third table 15 receives various channels coming from the audio lines 8.

Alternatively, the system 1 is devoid of a secondary splitter 14, and the third table may be directly connected to one of the tables 9, 12, preferably to the first table 9.

Furthermore, in the case of a non-living show (e.g. a movie), the system lacks microphones, the audio lines being prerecorded.

The sound system 1 comprises at least one broadcasting transmitter 17 to which the third table 15 is connected and which is configured to collect the different channels coming from it and to radio broadcast them in multichannel mode by means of an antenna 18, e.g. conform to the IEEE 802.11 standard. It will be ensured that the whole hall 5 has coverage by adapting the power of the transmitter 17 and, if necessary, by providing a plurality of transmitters 17 connected to the third table 15, disseminated so as to maximize the coverage of the broadcasting. Alternatively, the transmitter 17 and the third table 15 together form a single appliance.

The broadcasting carried out by the transmitter 17 is community, i.e. the broadcast is common for a set of recipients, which are not necessarily identified by the transmitter 17 and which may capture the broadcast as soon as they are configured for this purpose and are within range of the transmitter 17.

The broadcast mode is multi-channel, i.e. the signal broadcasted by the transmitter 17 comprises each audio track taken separately from the others. Audio tracks may be multiplexed within the broadcast signal.

Figure 2:
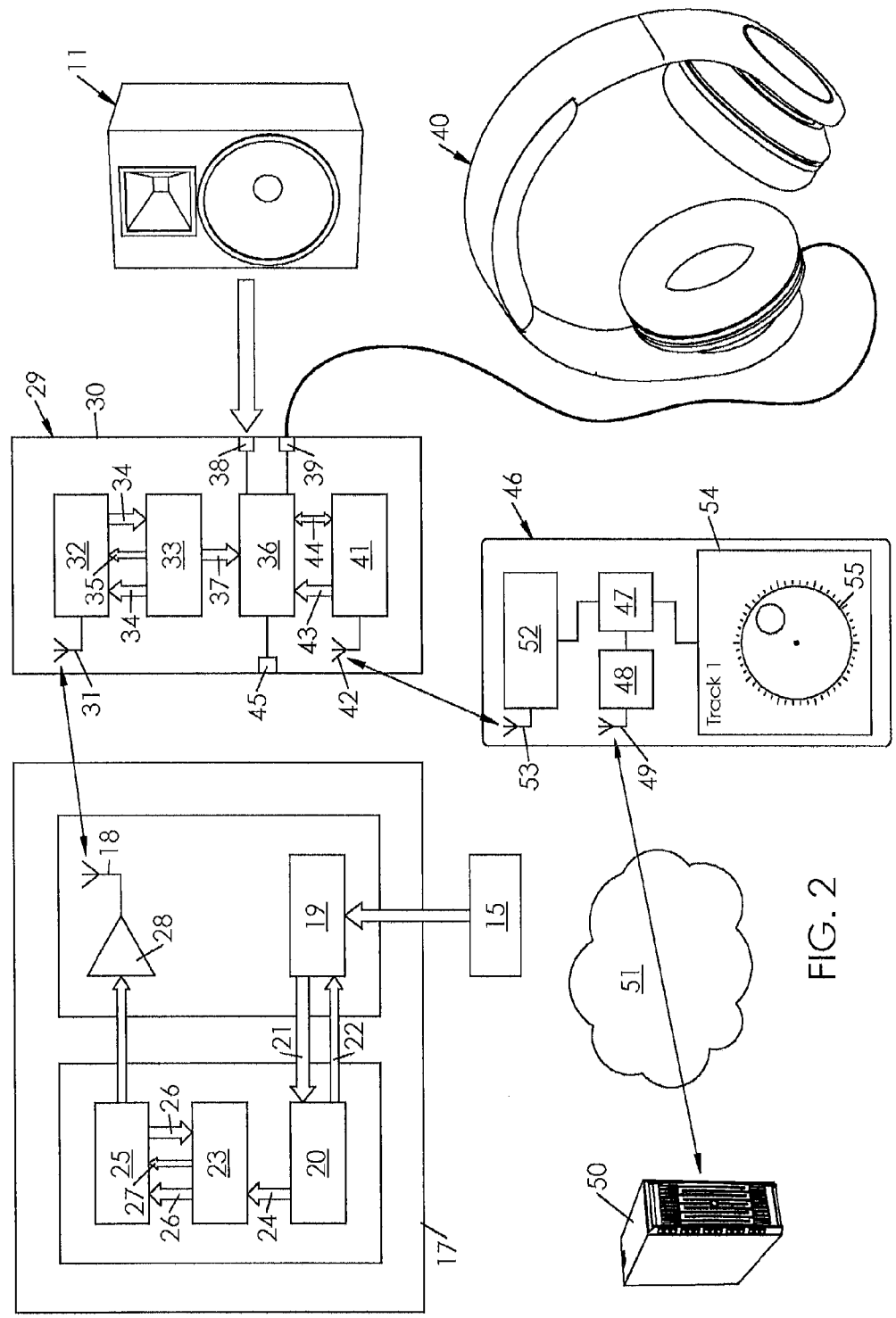
FIG. 2 is a schematic view detailing the functional architecture of the system.

The transmitter 17, illustrated on FIG. 2, comprises:
a multichannel analog-to-digital converter (ADC) 19 configured to collect by analog differential inputs the analog signals from the third mixing table 15 and to convert them into digital signals;
a Digital Signal Processor (DSP), programmed to process in real-time the digital signals delivered to it by the ADC 19, in particular by applying filters and conversion to radiofrequency signals; the signals are transmitted by the ADC 19 to the DSP 20 via a data bus 21 in conformity with the I2S (Integrated Interchip Sound) standard, which has the advantage of minimizing the jitter phenomena in the signal; the DSP 20 provides control of the ADC 19 via a serial peripheral interface (SPI) bus 22, which enables a master-slave type control in which the ADC 19 is enslaved to the DSP 20 which generates the clock signal for the I2S bus 21 to send the data;
a modulator 23, which receives the processed audio stream from the DSP 20 via an I2S bus 24 to apply in-phase and quadrature (I/Q) modulation to it;
a radio transmitter 25 which receives the modulated signal from the modulator 23 via an I/Q bus 26 looping the radio transmitter 25 to the modulator 23 and which is connected to the antenna 18 for the radio broadcasting of the channels (over the air).

According to a preferred embodiment illustrated in FIG. 2, the modulator 23 provides control of the radio transmitter 25 via a serial peripheral interface (SPI) bus 24, whereby the radio transmitter 25 is controlled by modulator 23.

Moreover, according to a preferred embodiment, the radio transmitter 25 is connected to the antenna 18 via an amplifier 28 which applies a coefficient of proportionality to the signal from the radio transmitter 25 in order to increase its power (and hence its range).

The sound system 1 also comprises an appliance 29 for receiving and reading the audio signals received from the transmitter 17. As illustrated in FIG. 1 and FIG. 2, the appliance 29 comprises a casing 30 and, in this casing 30:
an antenna 31 and a receiver 32 of high-frequency electromagnetic (HF) waves, coupled to the antenna 31 and configured to pick up the signals broadcasted by the transmitter 17 (and, as we have seen, integrating several audio tracks);
a demodulator 33 which receives the modulated signal from the receiver 32 via a I/Q bus 34 looping the receiver 32 and the demodulator 33 and which is programmed to demodulate this signal; according to a preferred embodiment illustrated in FIG. 2, the demodulator 33 ensures the control of the receiver 32 via a serial peripheral interface (SPI) bus 35, by which the receiver 32 is enslaved to the receiver 32 and to the demodulator 33;
a DSP 36 programmed to process in real-time the digital signals delivered to it by the demodulator 33, in particular by applying filters and adjustments which will be detailed hereinafter; the signals pass through an I2S bus 37;
a microphone 38 integrated in the casing 30 and connected to the DSP 36;
an audio output 39 (e.g. of the 3.5 mm jack type) integrated in the casing 30 and connected to the DSP 36 to allow the connection of a sound reproduction device such as an audio headset 40 for the sound reproduction of the signals processed by the CSP 36;
a wireless communication interface 41, distinct from the receiver 32, e.g. UHF and conform to the IEEE 802.15 standard (called "Bluetooth®"), connected to an antenna 42. The signals received by the interface 41 transit to the DSP 36 via a standard I2S data bus 43; in parallel, the DSP 36 controls the interface 41 by an asynchronous circuit 44 of the UART (Universal Asynchronous Receiver Transmitter) type;
preferably a port 45 for connecting the appliance 29 to peripherals (e.g. a programming computer), or to the mains for charging a battery integrated in the appliance 29.

Various other wireless communication protocols may be suitable for interface 41: the IEEE 802.11 standard (commonly known as WiFi) or its equivalent HiperLAN (High PERformance Radio Local Area Network), the General Packet Radio Service (GPRS) standard, The IRDA (Infra-Red Data Association) protocol, the WUSB (Wireless Universal Serial Bus).

As can be seen in FIG. 2, the sound system 1 also comprises a mobile terminal 46 of the Smartphone, tablet or laptop type. The terminal 46 is configured to control the appliance 29 and comprises:

a processor 47;

a primary wireless communication interface 48 connected to the processor 47 and to an antenna 49 and configured to communicate with a remote server 50 via a local area network (LAN), a metropolitan area network (MAN) or even an wide area network (WAN), e.g. the Internet, via standard protocols such as Universal Mobile Telecommunications System (UMTS), 3G, or long-term evolution (LTE) 4G;

a wireless communication interface 52, e.g. at ultra-high frequencies (UHF) of the IEEE 802.15 standard ("Bluetooth®") type, connected to an antenna 52 and to the processor 47;

a graphical interface 54, such as a touch screen.

The other wireless communication protocols mentioned above may also be suitable for the realization of the interface 52.

The processor 47 integrates an application (which may be downloaded remotely via the processor 47 connecting for this purpose to the server 50) comprising instructions for making available to the listener 2, via the graphical interface 54, different settings for each track (such as a gain level and a pan level) and for communicating, via the antennas 53, 42 and the interfaces 52, 41, the adjustments thus made to the processor 36 of the appliance 29 so that it applies to the different tracks before returning them to the headset 40 via the output 39.

The listener 2 hence has an appliance 29, which may be loaned to him/her when he/she enters the hall 5 and until the end of the show, and a terminal 46, which may be his/her own Smartphone. The wireless communication between the appliance 29 and the terminal 46 is of the point-to-point type, so as to guarantee the uniqueness of the adjustments made by the listener 2 and to prevent these adjustments from being extended undesirably to other appliances 29. For this purpose, the appliance 29 and the terminal 46 are, prior to the establishment of a media session between them, paired by a conventional procedure in which the appliance 29 and the terminal 46 exchange signaling messages containing their identifiers and their respective URLs (uniform resource locators). It is conceivable to match a terminal 46 with several appliances 29 that are then controlled by the same terminal 46 so that a same setting controlled by it is deployed on all appliances 29.

It will be noted that the media session between the terminal 46 and the appliance 29 does not necessarily include the exchange of the audio tracks. Indeed, it is sufficient that the application programmed in the terminal 46 allows for making adjustments on the broadcast audio tracks, the sound experience of the listener 2 being sufficient to know whether those adjustments are suitable for him/her. The application programmed in the terminal 46 may, for this purpose, be dedicated to the current show, and automatically integrate the proper audio tracks.

Alternatively, the application is reusable for several shows and includes a determined number of potentiometers, some of which may be activated or deactivated via a software update available for download by the listeners from the server 50, from the beginning and for the duration of the show.

As illustrated in FIG. 2, the setting proposed to the listener 2 for each track via the graphic interface 54 of the terminal 46 may be in the form of a potentiometer emulation 55. The settings may also be grouped together for all the tracks, for example under the form of a graphic emulation of a mixing table.

The listener 2 may, by performing for each audio track adjustments of his choice (in particular the sound level of each track), improve his sound experience by proceeding to his own mixing from the raw audio data received from the transmitter 17 by the appliance 29.

In one embodiment, the various audio tracks are, at the level of the third mixing table, all preset at an average level, enabling the listener 2 to have at the beginning of the broadcast a default audio signal (e.g. set by a sound engineer) allowing for comfortable listening which some unconcerned listeners may feel they do not need to touch up.

A listener 2 equipped with an appliance 29 coupled to a mobile terminal 46 as described above, may apply to the various audio tracks (which are reproduced mixed in his/her headset 40) the adjustment parameters that are suitable for him/her, which enables him/her to adapt it to its needs, its tastes and its faculties (hearing acuity, inaudible frequencies, psychoacoustic problems, asymmetrical sensitivity between the two ears for example).

In other words, multitrack broadcasting enables the listener 2 to act at his convenience on one or more audio tracks carried on dedicated tracks in order to finally obtain a personalized mix. The listener 2, who locally disposes of all the multi-track sound contents (i.e. the tracks are isolated from each other at the device 29), may, via the application he/she has installed on his/her mobile terminal 46, modify at will the sound of the contents.

There may however be a time lag between the audio signal perceived by the listener 2 in his/her headset 40 and the audio signal perceived by the listener 2 coming from the PA 11. The signals are both real-time signals from the same sound sources 4 via the same microphones 6, but the signal in the headset 40 has traveled to the listener 2 at the speed of light (i.e. 300000 km/s), whereas the signal from the PA 11, which may appear to be synchronized with the signal in the headset 40 when the latter is close to the PA 11, is lagging behind when the headset 40 is distant from the PA 11, due to the path which separates the listener 2 from the PA 11, which path is traveled at the speed of sound (i.e. approximately 340 m/s). Thus, from the point of view of a listener 2 located at a distance of approximately 20 meters from the PA, the perceived time lag between the two signals is about 60 milliseconds. This lag is important enough to be fully detected by the human ear and to be a discomfort for the listener 2 who will feel an unpleasant echo effect.

In to one embodiment, in order to minimize (or even eliminate) this echo effect, and no matter the position of the listener 2 in the hall 5, the appliance 29 (and more specifically its DSP 36) is programmed for sensing, via its built-in microphone 38, the sound environment in its vicinity (and, therefore, in the vicinity of the listener 2).

The DSP 36 is programmed to:
evaluate the phase shift between the acoustic signal picked up by the microphone 38 (ambient signal) and the signal intended for the headset 40 (mixed signal), for example by calculating the delay between maxima;
performing a time recalibration of the mixed signal onto the ambient signal, so as to synchronize them.

In one embodiment, the evaluation of the delay between maxima is performed at a predefined frequency of the sound spectrum, e.g. at a low frequency (corresponding to a deaf sound such as a kick drum) or on the contrary at a high frequency (corresponding to a high-pitched sound such as a hi-hat cymbal tempo).

The time recalibration between the two acoustic signals is obtained by delaying the mixed signal of the estimated difference between the maxima of the two signals. This difference is preferably re-estimated regularly (e.g. at regular intervals of 1 second or less) to take into account any factors that may change its value (such as a movement of the listener 2 in the hall 5 or a change in the physical configuration of the sound scene such as adding and/or removing an obstacle).

Since the microphone 38 is integrated with the appliance 29 and therefore permanently worn by the listener 2, it follows that the time replacement will automatically update accordingly.

The time recalibration does not eliminate the physical sensations due to the acoustic pressure exerted on the body of the listener 2, in particular in the low frequencies (it is thus known that the kicks of bass drums have repercussions, at high sound volume, in the abdomen and rib cage of the listeners). But physical sensations are part of the live experience, and since the sensations are synchronized with the mixed signal, the listener 2 may have the illusion that they are generated by the quality mixed audio signal heard in his/her headset 40.

However, if the time recalibration allows the echo effect to be reduced (or even suppressed), it does not correct the quality defects of the ambient signal, in particular if the acoustics of the hall and/or the sound 11 and/or the mixing of the signal delivered by it is/are degraded.

Therefore, in one preferred embodiment, the headset 40 is equipped with a Noise Canceling system in order to reduce the intensity of the ambient signal perceived by the listener 2 and thus to make the mixed signal predominant, in order to improve the listener's sound experience 2. There exist models of a fully equipped headset, cf. e.g. the headset of the BOSE® brand marketed under the name QuiefComfort®, or the headset of the PARROT® brand marketed under the name Zik®. In one non-limiting embodiment, the signal delivered by the third mixing table 15 is eight tracks, which the listener 2 may set separately from its terminal 46 and which are combined by the appliance 29 from these settings to construct a mixed audio signal according to the wishes of the listener 2.

In order to improve the sound experience of the listener 2, and in particular to enhance the live atmosphere in the mixed signal, it is advantageous to turn a microphone 6 towards the hall to pick up ambient noise, and especially participation noises (typically the resumption of chorus or applause). Noises from the hall are then allocated to a dedicated audio track, which the listener 2 may adjust in its mix. Similarly, it is advantageous to add, in the mixed signal to the listener's attention, a reverberation sound effect which gives the sound an acoustic coloring characteristic of the place.

Furthermore, in a preferred embodiment, the appliance 29 is miniaturized and integrated into the audio headphone 40.

It follows from the foregoing that the sound system 1 enables the listener 2:
to improve his/her sound experience by enabling him/her to become, in a way, his own sound engineer;
to overcome the acoustic constraints associated with hall 5;
to benefit from an optimum sound quality (the sound from the third mixing table 15 and mixed at will by the listener 2);
while enjoying a live experience with the advantages that are inherent to it (presence of artists, interactivity, festive atmosphere);
to improve his relationship with the artist by making it more intimate;
to immerse more completely in the show thanks to a spatialized sound.

By transferring the various sound tracks to the appliance 29 and consequently by delegating the audio processing to it as a personal box, the drawbacks (in particular the computational load) of a centralized architecture are overcome. However, the appliance 29 does not support the entire computational load since it is the terminal 46 (separate from the appliance 29) that displays the settings to the benefit of the listener 2.

This makes it possible to avoid equipping the appliance 29 with a graphic interface that consumes computational (and energy) resources, for the benefit of a large autonomy of operation.

The appliance 29 is preferably electrically autonomous, e.g. equipped with a battery (not shown) capable of being loaded episodically through a connection to the mains, in particular via a port of the USB (Universal Serial Bus) type.

Finally, thanks to its architecture, the sound system 1 enables the listener 2 to benefit from a constant experience of quality whatever its position with respect to stage 3 or with respect to the PA 11. From the acoustic point of view, therefore, there is neither a bad hall for the listener, nor a bad placement.

The invention claimed is:

1. An appliance for receiving and reading audio signals intended to equip a listener and to be controlled by a mobile terminal incorporating a graphic interface, the mobile terminal being distinct from the appliance, the appliance comprising:
a high frequency electromagnetic wave receiver configured to capture broadcast signals that include a plurality of audio tracks;
a wireless communication interface distinct from the wave receiver and configured to receive, from the mobile terminal, at least one tuning parameter to be applied to at least one audio track of the captured signal;
a digital signal processor configured to apply the tuning parameter to the audio track and output a mixed signal;
an audio output for the sound reproduction of the signal mixed by the processor.

2. The appliance according to claim 1, further comprising an embedded microphone, configured to capture a sound signal in the vicinity of the appliance.

3. The appliance according to claim 2, wherein the processor is configured to compute a time offset between the signal mixed by the processor and the sound signal captured by the microphone.

4. The appliance according to claim 3, wherein the processor is configured to apply to the mixed signal a delay equal to the computed time offset.

5. An audio headset incorporating an appliance according to claim 1.

6. The audio headset according to claim 5, further including an acoustic noise reduction system.

7. A sound system for a show, the sound system comprising:
a mixer that receives audio tracks;
a transmitter connected to the mixer and configured to communally broadcast the audio tracks in a multichannel mode;
at least one appliance for receiving and reading the broadcast signal, according to claim 1;
a mobile terminal configured to transmit to the receiving appliance, via its second communication interface, at least one tuning parameter to be applied to at least one audio track;

a headset connected to the audio output of the appliance, for the playback of the mixed signal.

8. The sound system according to claim 7, wherein, as the show is live and includes sound sources, the sound system includes microphones pointing at the sound sources to capture the sounds in the form of an electrical signal forming an audio track for each microphone.

* * * * *